(12) United States Patent
Schneider et al.

(10) Patent No.: US 12,510,379 B2
(45) Date of Patent: Dec. 30, 2025

(54) ELECTROMAGNETIC STROKE MEASURING SYSTEM, MAGNET HOLDER AND USE OF AN ELECTROMAGNETIC STROKE MEASURING SYSTEM

(71) Applicant: Knorr-Bremse Systeme Fuer Nutzfahrzeuge GmbH, Munich (DE)

(72) Inventors: Joerg Schneider, Schwieberdingen (DE); Friedbert Roether, Cleebronn (DE); Philipp Neubert, Burgstetten (DE); David Wimmer, Stuttgart (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 188 days.

(21) Appl. No.: 18/550,567

(22) PCT Filed: Mar. 28, 2022

(86) PCT No.: PCT/EP2022/058118
§ 371 (c)(1),
(2) Date: Sep. 14, 2023

(87) PCT Pub. No.: WO2022/218679
PCT Pub. Date: Oct. 20, 2022

(65) Prior Publication Data
US 2024/0060799 A1     Feb. 22, 2024

(30) Foreign Application Priority Data
Apr. 14, 2021   (DE) .................... 10 2021 109 267.1

(51) Int. Cl.
*G01D 5/14*      (2006.01)
(52) U.S. Cl.
CPC .................. *G01D 5/145* (2013.01)

(58) Field of Classification Search
CPC ..................................................... G01D 5/145
See application file for complete search history.

(56) References Cited

U.S. PATENT DOCUMENTS

| | | | |
|---|---|---|---|
| 10,124,778 B1* | 11/2018 | Forwerck ............ | B60R 16/0231 |
| 2019/0039590 A1 | 2/2019 | Maruo et al. | |
| 2023/0278532 A1* | 9/2023 | Schaust .................. | B60T 7/042 |
| | | | 303/113.4 |

FOREIGN PATENT DOCUMENTS

| | | |
|---|---|---|
| DE | 3319522 A1 | 11/1984 |
| DE | 19637296 A1 | 3/1998 |

(Continued)

OTHER PUBLICATIONS

International Search Report for PCT/EP2022/058118, Issued Jun. 29, 2022.

*Primary Examiner* — Reena Aurora
(74) *Attorney, Agent, or Firm* — NORTON ROSE FULBRIGHT US LLP

(57) ABSTRACT

An electromagnetic stroke measuring system, including: a plunger with a longitudinal axis pointing in the stroke direction, in which the plunger is arranged in a housing in the direction of the longitudinal axis and is movable in the direction of the longitudinal axis in the housing, a magnet holder with a magnet arranged in a magnet portion of the magnet holder, in which the magnet holder is arranged on a radial periphery of the plunger with respect to the longitudinal axis to be moved together with the plunger in the radial direction, and a sensor element which is arranged on a side of the housing facing away from the plunger with respect to the longitudinal axis, in which the housing forms a guide in which the magnet portion is guided in the direction of the longitudinal axis at least in portions. Also described is a related vehicle.

18 Claims, 2 Drawing Sheets

(56) References Cited

FOREIGN PATENT DOCUMENTS

| DE | 10057674 A1 | 5/2002 |
| DE | 102012222547 A1 | 6/2013 |
| DE | 102014007004 A1 | 11/2014 |
| EP | 3620754 A1 | 3/2020 |
| WO | 2020006099 A1 | 1/2020 |

* cited by examiner

ELECTROMAGNETIC STROKE MEASURING SYSTEM, MAGNET HOLDER AND USE OF AN ELECTROMAGNETIC STROKE MEASURING SYSTEM

FIELD OF THE INVENTION

The present invention relates to an electromagnetic stroke measuring system, a magnet holder with a magnet for such a stroke measuring system and a use of such a stroke measuring system.

BACKGROUND INFORMATION

Electromagnetic stroke measuring systems which have, for example, a Hall sensor and a magnet can be used for measuring a stroke. The Hall sensor measures the magnetic field which emanates from the magnet. If the magnetic field changes around the Hall sensor this is detected by the Hall sensor and correspondingly electronically processed and forwarded to an evaluation system. The quality and accuracy of the sensor system or the measuring results depend, amongst other things, on the strength and the stability of the magnetic field at the corresponding measuring position. The strength of the magnetic field is determined by the distance of the magnet from the sensor in the lateral or radial and transverse direction.

Such an electromagnetic stroke measuring system is installed, for example, in a foot brake module. The electromagnetic stroke measuring system determines the position of the plunger in the foot brake module via the position of the magnet with respect to the Hall sensor. The Hall sensor is installed in a fixed position in the foot brake module and thus is constant in all three spatial directions in terms of its position with respect to a housing in which the plunger is moved. Due to the stroke movement of the plunger, the magnet is guided past the sensor in the direction of the stroke movement, i.e. an axial direction with respect to a longitudinal axis of the plunger, and the respective relative position is detected. Relative movements of the magnet in other spatial directions are undesirable since they falsify the signal and thus the apparently detected stroke position.

In this context, EP 3 620 754 A1 discusses a magnet holder which has a holding portion enclosing the plunger peripherally, wherein the holding portion is guided via a housing through-passage. The magnet portion having the magnet and held by the holding portion is arranged outside the housing through-passage and protrudes in the direction of the sensor. Since the magnet holder is guided merely in a portion facing away from the magnet, for example, small relative movements in the peripheral direction of the plunger in the region of the guide lead to comparatively larger relative movements of the magnet portion outside the through-passage. Radial relative movements can also occur. However, due to the housing through-passage the sensor is also no longer separated from the guide space of the plunger by the housing, so that moisture and dirt can pass through the housing through-passage to the sensor. The measuring result can also be falsified or the sensor damaged thereby.

SUMMARY OF THE INVENTION

In view of the above embodiments, an object of the invention is to provide an electromagnetic stroke measuring system, a magnet holder and a use of the electromagnetic stroke measuring system via which a stroke measurement can be reliably implemented.

The object may be achieved by an electromagnetic stroke measuring system according to the description herein, a magnet holder with a magnet for such a stroke measuring system according to the description herein and a use of such a stroke measuring system according to the description herein. Advantageous developments of the invention are contained in the further descriptions herein.

According to the invention, an electromagnetic stroke measuring system has a plunger with a longitudinal axis pointing in the stroke direction, wherein the plunger is arranged in a housing in the direction of the longitudinal axis and can be moved in the direction of the longitudinal axis in said housing. Additionally, the electromagnetic stroke measuring system has a magnet holder with a magnet arranged in a magnet portion of the magnet holder, wherein the magnet holder is arranged on a radial periphery of the plunger with respect to the longitudinal axis in order to be moved together with the plunger in the axial direction, and a sensor element which is arranged on a side of the housing facing away from the plunger with respect to the longitudinal axis. The housing forms a guide in which the magnet portion is guided in the direction of the longitudinal axis at least in portions.

Since the magnet holder is moved together with the plunger in the axial direction with respect to the longitudinal axis, a position of the magnet corresponds to a position of the plunger. The guidance of the magnet portion at least in some portions in the guide of the housing thus substantially permits the direct reproduction of the plunger movement or the plunger position corresponding thereto in the stroke direction. By guiding the magnet portion, it is possible to compensate for potential relative movements of the remainder of the magnet holder in spatial directions deviating from the axial direction, or at least the effect thereof can be reduced. Even if this is not always intended to be explicitly specified, terms which refer to directional information such as radial or axial, refer hereinafter to the longitudinal axis of the plunger.

Thus the magnet portion or the magnet received therein can be directly guided so that the measuring accuracy is increased or a measuring inaccuracy is reduced. The magnet portion can also be configured directly above the magnet.

Hall sensors or magneto-resistive sensors which generate sensor signals corresponding to a change in the magnetic field, for example by a change in the resistance in the sensor element, can be used as the sensor element. Examples of magneto-resistive sensors are, amongst others, GMR sensors, AMR sensors or TMR sensors. The so-called Hall voltage, which changes due to a change in the magnetic field, is measured by the Hall sensors on the basis of the Hall principle. This principle is based on the Hall effect of the current-carrying electrical conductor. However, a magneto-resistive sensor is based on the fact that the electrical resistance in a ferromagnetic thin-film alloy is changed by an external magnetic field. In this context, the planar Hall effect is often cited, but this only exhibits a similar effect to the above-described conventional Hall effect.

According to a development, the guide surrounds the guided magnet portion in a peripheral direction on at least three points, in particular over the entire surface.

The guided magnet portion is accordingly surrounded peripherally by the guide in its axial movement with respect to the longitudinal axis. As the magnet portion is surrounded in a peripheral direction by the guide on at least three points, the magnet portion is sufficiently guided. A movement of the magnet portion is thus prevented in radial directions with respect to the longitudinal axis. The at least three points are located in the peripheral direction, for example, at a distance of 120°. In other words, the guide surrounds the guided magnet portion entirely in a peripheral direction. The term "entirely" relates to the fact that the guide surrounds the guided magnet portion completely such that a guide is provided over the entire periphery. The guide can also have interruptions which, however, have no effect on the guide properties.

In other words, no movement play in the radial direction of the guided magnet portion in the guide is permitted or increased by the interruptions. The term "over the entire surface" refers in this context to a guide surface which is closed over the entire periphery. Regarding the sensor element which is arranged opposite the housing, a configuration of the guide over the entire surface can protect the sensor element. Due to the guidance over the entire surface, the sensor element is thus also separated from the moving components by the housing. A penetration of moisture and/or dirt into the space in which the sensor element is arranged is thus prevented.

In one embodiment, the guide is configured such that the magnet portion can be moved in the direction of the longitudinal axis between a first position in which at least one end of the magnet portion facing the guide engages in the guide and a second position in which the magnet portion is introduced further into the guide.

The magnet portion is thus guided at least in some portions via the guide over the entire path in the direction of the longitudinal axis between the first position and the second position. The first and second position may represent the maximum stroke of the magnet holder corresponding to the maximum stroke of the plunger. Accordingly, the magnet portion can be moved via the guide over its entire movement in the direction of the longitudinal axis.

If the magnet portion merely engages in the guide in the first position and only protrudes further into the guide when moved into the second position, the magnet holder can be more easily assembled on the plunger and installed in the electromagnetic stroke measuring system. In particular, the guide can also form a simple limitation to the movement of the magnet holder in the second position, as is described below in more detail. The first position can thus correspond to an assembly position or initial position.

In one embodiment, the magnet holder has a holding portion which extends in the radial direction with respect to the longitudinal axis and is received in a recess provided therefor in the plunger.

The holding portion accordingly is a portion which extends in the radial direction from the magnet portion in the direction of the plunger. For arranging the magnet holder on the periphery of the plunger, the free end of the holding portion, i.e. the end facing away from the magnet portion in the radial direction, is received in a recess provided therefor in the plunger, in order to be movable together with the plunger in the axial direction.

In particular, the recess is configured as a radially peripheral groove with respect to the longitudinal axis, in particular a groove circulating over the entire periphery.

The term "radially peripheral groove" relates to the fact that the groove runs at least in some portions over the periphery of the plunger. It is also possible to form a plurality of radially peripheral groove portions which are arranged in the direction of the longitudinal axis and/or radially peripherally, i.e. at the same height with respect to the longitudinal axis. As a result, there is the option to provide a modular construction in order to be able to implement, for example, a plunger for different stroke measuring systems with different positional requirements for the magnet holder and/or to use a plurality of magnet holders. With a fully peripheral groove, this has no radially peripheral interruptions so that it is possible to select any receiving position for the holding portion and thus the magnet holder along the periphery of the plunger. A plurality of grooves circulating over the entire periphery can also be arranged spaced apart from one another in the axial direction.

Alternatively, the recess can also have a different geometric configuration which corresponds to the free end of the holding portion, in order to be able to receive this end of the holding portion.

The recess may be configured to be wider in the peripheral direction than the width of a region of the holding portion to be received therein in this direction. If, for example, the recess of the plunger is configured over a groove circulating radially over the entire periphery, a relative movement between the holding portion or the magnet holder and the plunger can take place over the entire periphery of the plunger. Even if the plunger in the housing rotates about its longitudinal axis, the magnet holder can continue to be held in the plunger and in the guide without the rotation of the plunger being transferred to the magnet holder. A corresponding configuration also requires no further lateral guides to prevent a radial rotation of the magnet holder on the housing or a cover of the housing, so that an embodiment with reduced wear can be implemented.

According to a development, the holding portion is mounted axially without play in the recess with respect to the longitudinal axis.

Accordingly, the axial movement of the plunger corresponds to the axial movement of the magnet holder. Due to the mounting without play in the axial direction, the magnet holder can also be prevented from tilting about an axis vertically to the longitudinal axis.

The mounting without play in the axial direction is configured, in particular, such that it does not suppress a movement of the holding portion in the recess in the peripheral direction and/or the radial direction, insofar as this is specified, or prevents excessive signs of wear or material stresses from occurring.

According to a development, the magnet holder is pretensioned in the axial direction with respect to the longitudinal axis via a spring elastic element which may be arranged in the guide between the end of the magnet portion facing the guide and an end of the guide opposing this end.

Via the pretensioning the holding portion can be pushed against one of the opposing side walls of the recess, whereby it is possible to mount the holding portion in the recess axially without play with respect to the longitudinal axis. To this end, the spring elastic element is configured, for example, as a compression spring which is arranged in the guide. The compression spring is supported with its one end on the end of the magnet portion facing the guide, and with its other end on the guide base opposite the magnet portion. The guide can also have a projection or projections which face radially inwardly and which serve as a support instead of the guide base. The compression spring then pushes the holding portion against the side wall of the opposing side walls of the recess, said side wall facing away from the guide. Alternatively, the spring elastic element can also be configured as a tension spring. In such a case, the tension spring pulls the holding portion against the side wall of the opposing side walls of the recess, said side wall facing the guide. To this end, the tension spring is correspondingly anchored at its support points. Irrespective of the configuration of the spring elastic element, for applying a compressive or tensile force, the spring elastic element is configured, in particular, such that the spring elastic element applies the pretensioning over the entire predetermined movement of the magnet holder or the plunger in the direction of the longitudinal axis.

In particular, the holding portion is mounted with play in the recess in the radial direction with respect to the longitudinal axis.

Via the play in the radial direction, relative movements between the region of the holding portion received in the recess of the plunger and the plunger are permitted in the radial direction. As a result, the effect of a radial movement of the plunger on the radial position of the magnet holder can be prevented or at least reduced.

In one embodiment, the plunger has a central axis which extends along the longitudinal axis, wherein a sensor surface of the sensor element facing the housing is arranged parallel to a sensor plane extending parallel to the central axis, and the guide is arranged opposite the sensor surface. The sensor element is arranged outside a plane spanned by a vertical line from the central axis to the sensor plane and the central axis.

The sensor plane is accordingly a plane relative to which the sensor surface of the sensor element facing the housing is oriented in parallel. In the sensor plane or parallel to the sensor plane in the radial direction, the sensor element is not located vertically to the central axis of the plunger but offset laterally thereto. According to the above configuration, in this regard the guide opposing the sensor element or the sensor surface is also outside the vertical. The housing with the guide can thus be brought closer to the sensor plane since the constructional space for the guide is displaced, as it were, out of the vertical by an angle. Thus the stroke measuring system can be configured to be more compact.

According to a development, the plunger is guided in a plunger guide in the direction of the longitudinal axis.

The plunger guide can form a cover of the housing so that no additional components have to be installed for the guidance of the plunger. The plunger guide can be configured, for example, from a plastics material. The plunger guide may be arranged in the direction of the longitudinal axis of the plunger opposite the guide opening of the guide for the magnet holder. The magnet holder accordingly moves in the axial direction in a region between the plunger guide and an end of the guide of the magnet holder facing away from the guide opening. The plunger guide can form a stop for the plunger on a side facing the guide opening in the axial direction, so that a movement of the plunger in the direction of the plunger guide is limited. To this end, the plunger has, for example, a plunger guide portion which is provided for guiding the plunger in the plunger guide and which has a smaller diameter than the region of the plunger which can come to bear against the stop formed by the plunger guide. The stop position of the plunger on the plunger guide can correspond, for example, to the first position already set forth.

In particular, the plunger is pretensioned in the axial direction with respect to the longitudinal axis via a spring elastic element, which may be in the direction of the plunger guide.

The plunger can be held in a predetermined initial position by the spring elastic element. For example, the spring elastic element pretensions the plunger in the direction of the above-described plunger guide so that the plunger can be held without further action of force, for example, to bear against the stop formed by the plunger guide. To this end, the spring elastic element can be configured as a compression spring which is arranged in the plunger and can be supported against a support surface opposite the plunger guide in the axial direction. The spring can alternatively also be guided externally around the plunger so that the plunger is arranged inside the spring windings.

In a further aspect, the invention relates to a magnet holder with a magnet for an electromagnetic stroke measuring system according to the invention, wherein the holding portion of the magnet holder is configured as an extending arm and the magnet portion extends at an angle, in particular substantially vertically, to the extending arm.

The magnet holder thus forms an L-shaped body, wherein one limb has the holding portion as an extending arm and the other limb forms the magnet portion. By a substantially vertical arrangement of the limbs to one another, the magnet portion can be guided parallel to the sensor element with a correspondingly vertical reception of the holding portion in the recess of the plunger with respect to the longitudinal axis. The parallel movement permits an embodiment of the guide of the magnet portion with as little tolerance as possible. The substantially vertical arrangement of the limbs to one another relates to possible production tolerances which can lead to slight deviations.

In one embodiment, in a plane of the holding portion from which the magnet portion extends, the holding portion has at one free end two holding arms which extend outwardly, in each case laterally on both sides of the holding portion, which are curved, in particular, in the direction of extension and which face away from the magnet portion.

Due to the holding arms, the region of the holding portion to be received in the recess of the plunger, as the above-described groove, can be enlarged without having to increase the holding portion as a whole. The holding arms have to be adequately dimensioned according to the existing holding conditions, such as weight, leverage and the like. The holding arms may be configured in each case symmetrically to one another for a balanced holding of the region of the holding portion held in the recess. Due to the curved shape of the holding arms, wherein the curved ends of the holding arms face away from the magnet portion, the holding arms can replicate, for example, the shape of a groove as a recess for receiving the holding arms. The holding arms can thus have the largest possible bearing surface in the axial direction without forming interfering contours. Moreover, the holding arms can also be used for fixing the magnet holder in the recess of the plunger during assembly.

According to a development, surfaces of the holding arms which run substantially parallel to the plane of the holding portion, from which the magnet portion extends, are configured to be convex at least in some portions.

Due to the convex configuration of the surfaces, the holding arms can absorb a rotation of the plunger about an axis running vertically to the longitudinal axis. In this context, the term "substantially parallel" refers to the fact that a convex surface does not strictly run parallel to a plane. Accordingly, the surface orientation is addressed via the term. Regarding the above fixing during assembly, the convex configuration of the holding arms also provides the possibility of being able to carry out compensation movements during the assembly process.

The invention also relates in a further aspect to the use of an electromagnetic stroke measuring system according to the invention for a foot brake module.

The advantages of the corresponding use are present in a similar manner to the previous embodiments. In particular, the use of the electromagnetic stroke measuring system for foot brake modules can increase the safety due to the more reliable stroke measurement and thus is specifically advantageous for safety-relevant applications.

The invention is explained in more detail hereinafter with reference to the accompanying figures.

DETAILED DESCRIPTION

Figure 1:
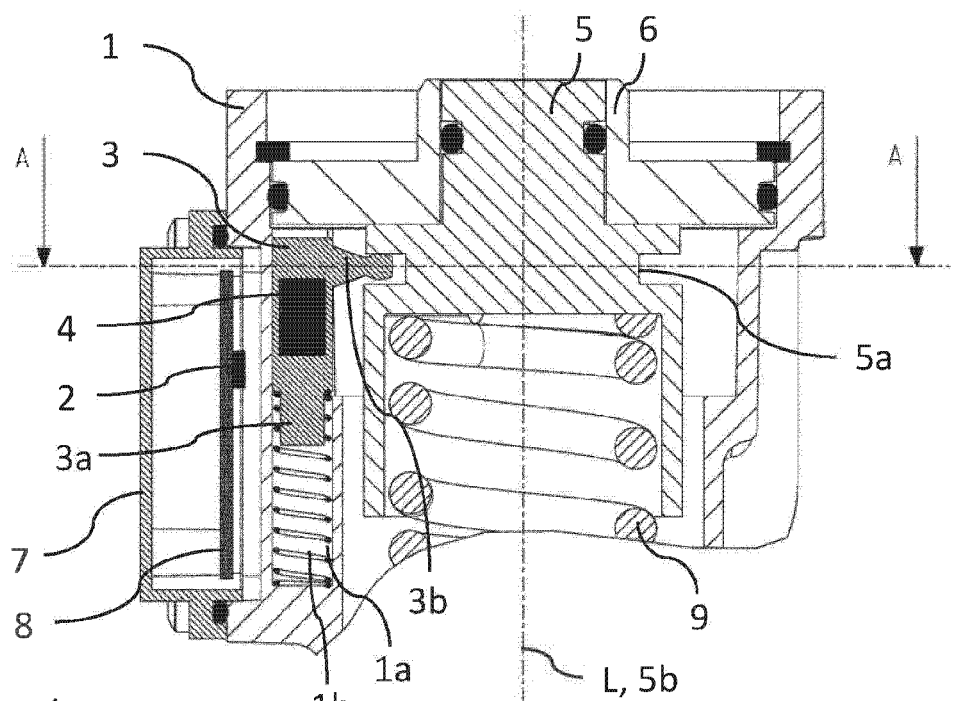
FIG. 1 shows a schematic cross-sectional view of an electromagnetic stroke measuring system in a cutting plane along a longitudinal axis according to an exemplary embodiment.

FIG. 1 shows a schematic cross-sectional view of an electromagnetic stroke measuring system in a cutting plane along a longitudinal axis (L) according to an exemplary embodiment. The stroke measuring system has a plunger 5, wherein the longitudinal axis L faces in the direction of the stroke movement of the plunger 5. The plunger 5 is arranged in a housing 1. The housing 1 receives the plunger 5 and surrounds it about its radial periphery with respect to the longitudinal axis L. An axial end of the plunger 5 is guided in a plunger guide 6 in the axial direction. The plunger 5 is thus movably guided in the axial direction. The plunger guide 6 forms a type of cover for the housing 1 here. The stroke of the plunger 5 in the direction of the plunger guide 6 is limited by a stop formed by the plunger guide 6. The plunger 5 has a shoulder between a portion to be moved in the plunger guide 6 and the portion protruding further into the housing 1. The shoulder can be formed by a radially outwardly facing projection or a general cross-sectional enlargement of the plunger 5. In the exemplary embodiment shown, the plunger 5 is a cylindrical body with two portions which in each case have a different diameter. The plunger portion with the smaller diameter serves to guide the plunger 5 in the plunger guide 6. The shoulder is formed by the plunger portion with the larger diameter adjoining thereto, the shoulder then being able to cooperate with the stop of the plunger guide 6. The bearing of the plunger 5 against the stop of the plunger guide 6 corresponds to a first position of the plunger 5 and thus a magnet holder 3, described in more detail hereinafter.

The plunger 5 is pretensioned in the direction of the plunger guide 6 by a spring elastic element 9, in this case a compression spring. To this end, the spring elastic element is arranged in an interior which is formed in the plunger 5 and which is open on a side facing away in the direction of the longitudinal axis L of the plunger guide 6. The spring elastic element 9 is supported in the direction of the longitudinal axis L on the inner face of the plunger 5 facing the plunger guide 6 and on a support surface, not shown here, opposing the inner face. Alternatively, the spring elastic element can also be arranged around the plunger 5 and can be supported on a projection on the plunger 5 facing radially outwardly with respect to the longitudinal axis L. Alternatively or additionally, a plurality of spring elastic elements can also be provided.

In order to be able to measure the stroke of the plunger 5, a sensor element 2 is arranged on a side of the housing 1 facing away from the plunger 5 in the radial direction. The sensor element 2 is arranged on a printed circuit board 8 which is fastened to the housing 1 via a sensor element cover 7. In the example shown, the sensor element 2 is located in a space formed by the housing 1 and the sensor element cover 7 and thus is protected from external influences.

The sensor element 2 detects a strength of a magnetic field of a magnet 4. The strength of the magnetic field detected by the sensor element 2 changes as a function of the relative position of the magnet 4 with respect to the sensor element 2. In order to measure the stroke, the magnet 4 only has to be moved in the axial direction in order to avoid a falsification of the measuring signal due to a change in the distance from the sensor element 2 in other spatial directions. The movement of the magnet 4 in the axial direction corresponds to a movement of the plunger 5 in this direction. To this end, the magnet 4 is arranged in a magnet portion 3a of a magnet holder 3.

According to an alternative embodiment, however, the magnet can also directly form the magnet portion or at least an exposed part thereof.

The magnet holder 3 is in turn received via a region of a holding portion 3b in a groove 5a of the plunger 5. The groove 5a is configured here as a groove circulating radially over the entire periphery. The magnet holder 3 is entrained with an axial movement of the plunger 5, due to the arrangement of the holding portion 3b in the groove 5a at least in some portions. The region of the holding portion 3b received in the groove 5a is mounted in the groove 5a without play in the axial direction.

The holding portion 3b of the magnet holder 3 forms an extending arm which extends radially outwardly from the groove 5a with respect to the longitudinal axis L, i.e. when viewed from the plunger radially in the direction of the housing 1. The magnet portion 3a extends from an end of the holding portion 3b in the axial direction facing away from the plunger 5 in the radial direction. Starting from the holding portion 3b, the extent of the magnet portion 3a is oriented in a direction facing away from the plunger guide 6, in this case downwardly in the image plane. The magnet holder 3 is thus configured as an L-shaped body, wherein the limbs form an angle of 90° here.

Regarding the above-desired, substantially exclusive movement of the magnet portion 3 and thus of the magnet 4 in the axial direction, the magnet portion 3a is moved so as to be guided in the axial direction in a guide 1a. The guide 1a is formed by the housing 1 and forms a guide channel. A part of the guide 1a is formed by an outer wall of the housing 1, wherein the guide channel is closed by an internal wall portion in the peripheral direction. The magnet portion 3a which is guided in the guide 1a is accordingly surrounded entirely and over the entire surface in the guided region in the guide 1a in the radial peripheral direction. The guide 1a is configured such that the radial side walls of the guide 1a surround substantially without play the region of the magnet portion 3a which is guided therein. A configuration substantially without play serves for preventing a movement of the magnet portion 3a in the guide 1a in a spatial direction which differs from the axial direction. At the same time, however, an axial movement is also permitted. The term "substantially" refers in this context to the fact that regarding the given and/or required measuring accuracy, slight movements can be tolerated in a spatial direction which differs from the axial direction.

The guide 1a of the magnet portion 3a has a guide opening facing in the axial direction of the plunger guide 6, for receiving the magnet portion 3a. In the first position in which the plunger 5 bears against the stop formed by the plunger guide 6, the magnet portion 3a engages in the guide opening and thus in the guide 1a with a free end facing away from the holding portion 3b in the axial direction. If the plunger is now moved into the housing 1 counter to the spring force of the spring elastic element 9 in the axial direction, the magnet holder 3 is entrained in the same direction. As a result, the magnet portion 3a is introduced further into the guide 1a. An edge is formed by the internal wall portion of the guide 1a in the region of the guide opening. The magnet holder 3 is movable in the axial direction between the first position and a second position in which the magnet portion is introduced further into the guide 1a. The magnet portion 3a is thus guided past the sensor element 2 in a positionally secure manner by the guide 1a which is oriented in the axial direction parallel to the sensor element 2.

Additionally, a spring elastic element 1b is arranged in the guide 1a between an end of the magnet portion 3a facing the guide 1a and an end of the guide 1a opposing this end. The spring elastic element is configured as a compression spring here, the spring force thereof acting in the direction of the longitudinal axis L. The compression spring pretensions the magnet holder 3 in the axial direction in the direction of the plunger guide 6. Accordingly, the holding portion 3b is pushed in the groove 5a against a side wall which faces the plunger guide 6 and which extends in the radial direction with respect to the longitudinal axis. The holding portion 3b can thus be held without play in the groove 5a in the axial direction.

Figure 2:
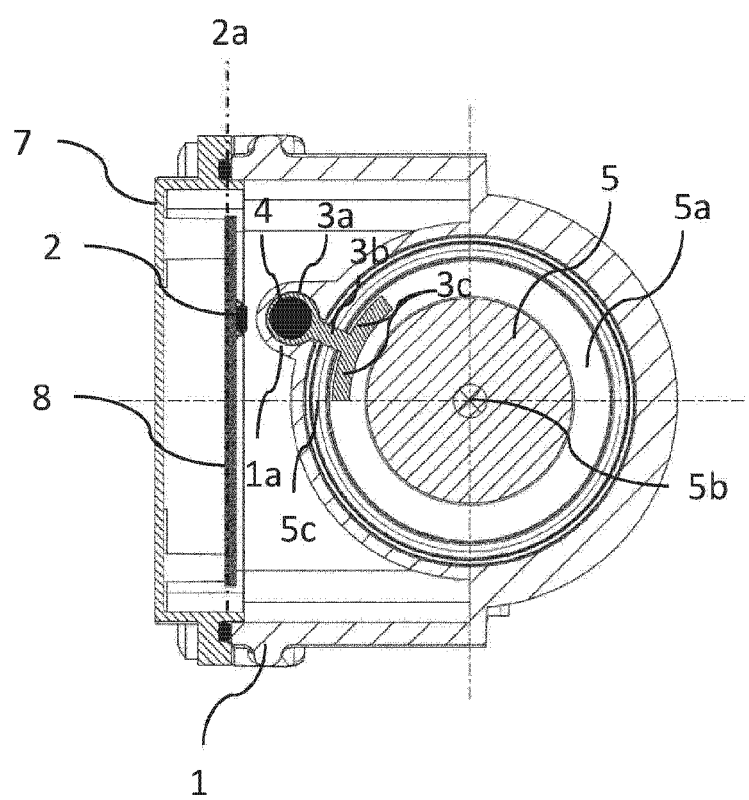
FIG. 2 shows a schematic cross-sectional view of the electromagnetic stroke measuring system according to FIG. 1 along the line A-A.

With reference to FIG. 2, the arrangement of the free end of the holding portion 3b in the groove 5a of the plunger is explained in more detail hereinafter. FIG. 2 shows a schematic cross-sectional view of the electromagnetic stroke measuring system according to FIG. 1 along the line A-A.

According to the cross-sectional view along the line A-A, the holding portion 3b has two holding arms 3c on its free end facing away from the magnet portion 3b in the radial direction. The holding arms 3c extend on both sides of the holding portion 3b in a plane parallel to the direction of extent of the holding portion 3b from the magnet portion 3a in the direction of its free end. The direction of extent of the holding portion 3b corresponds to the radial direction in the state arranged on the periphery of the plunger 5. The holding arms are configured to be curved in the plane parallel to the direction of extent of the holding portion 3b, wherein the free ends of the holding arms 3c face away from the magnet portion 3a due to the curvature. In other words, the holding arms form a convex arc with respect to the magnet portion 3a and a concave arc with respect to the plunger 5. The radius of the arc formed by the holding arms 3c substantially corresponds to the radius of the groove 5a. The width of the holding arms 3c in the plane parallel to the direction of extent of the holding portion 3b is slightly smaller here than the groove depth of the groove 5a in the radial direction. A radial relative movement between the holding arms 3c and the plunger 5 is made possible due to the smaller width. At the same time, however, the width of the holding arms is at least sufficiently large that the holding arms 3c do not move out of the groove 5a in the case of a maximum relative movement in the radial direction. The effect of a radial displacement of the plunger 5 on the magnet holder is prevented or at least reduced due to the radial play, in combination with the reception of the magnet portion 3a in the guide 1a.

The magnet holder 3 can also move in the peripheral direction with respect to the plunger 5 along the groove 5a circulating radially over the entire periphery. Thus the effect of the plunger 5 rotating about its longitudinal axis L can also be eliminated. Thus no further lateral guides are required for preventing a rotation of the magnet holder 3 on the housing or on the plunger guide 6 or the cover, so that signs of wear can be minimized.

The cross-sectional view according to FIG. 2 also shows the arrangement of the guide 1a of the magnet portion 3a with respect to the sensor element 2. The guide 1a of the magnet portion 3a is formed here via a radially outwardly facing housing projection of the housing 1. The sensor element 2 has a sensor surface which faces the housing 1 and which is oriented parallel to a sensor plane 2a extending parallel to a central axis 5b of the plunger 5 (the central axis 5b corresponds here to the longitudinal axis L of the plunger 5). The sensor surface facing the housing 1 is arranged opposite the guide 1a of the magnet portion 3a. The arrangement of the sensor element 2 or the sensor surface opposite the guide 1a is outside a plane spanned by a vertical line 5c from the central axis 5b to the sensor plane 2a and the central axis 5b. In other words, starting from a vertical line dropped through the central axis onto the sensor plane in the radial direction, the housing projection forming the guide 1a has an angular offset. As a result, the housing 1 as a whole can be brought closer to the sensor element 2, so that a more compact configuration is made possible. This is also possible due to the fact that the guide 1a only has a radial housing projection and thus only in some portions a radial cross-sectional enlargement.

Figure 3:
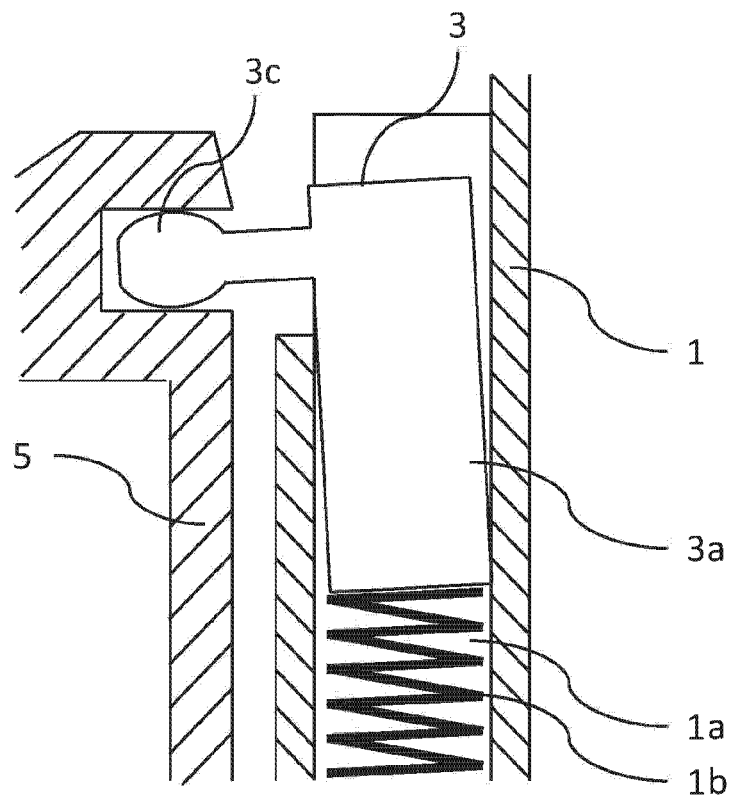
FIG. 3 shows a schematic cross-sectional view of an enlarged detail of the stroke measuring system in the region of the magnet holder according to FIG. 1.

FIG. 3 shows a schematic cross-sectional view of an enlarged detail of the stroke measuring system in the region of the magnet holder according to FIG. 1. The enlarged cross-sectional view illustrates a convex configuration of the surfaces of the holding arms 3c which run substantially parallel to the plane of the holding portion 3b from which the magnet portion 3a extends. Due to the convex configuration of the surfaces, the holding arms 3c can absorb a rotation of the plunger about an axis running vertically to the longitudinal axis. Thus an effect of the plunger 5 rotating about an axis vertically to the longitudinal axis L is prevented or at least reduced on the magnet holder 3. Conversely, as shown here, however, it is also possible to compensate for a slight tilting of the magnet portion 3a in the guide 1a. The convexity of the surfaces is provided for the surfaces running in the radial direction, i.e. in one spatial direction. In an alternative embodiment, a convexity can be provided in two spatial directions, i.e. for example also on the axially running surface of the holding portion 3b facing the groove base of the groove 5a. The convexity leads to a convex configuration of the respective surfaces The slight tilting of the magnet holder 3, shown in FIG. 3, is shown in an exaggerated manner for illustration. As set forth above, the radial side walls of the guide 1a surround substantially without play the region of the magnet portion 3a which is guided therein. The absence of play here is also achieved by the spring elastic element 1b in the guide 1a. A pivot point for the entire magnet holder 3 is present due to the bearing of the holding arms 3c in the groove 5a. The magnet holder 3 is pushed by the spring force in the guide 1a against two opposing points on the inner wall of the guide 1a, whereby the "absence of play" is achieved in the assembled state and thus also during operation.

The invention is not limited to the described embodiment. In particular, features described with respect to the embodiment, and configurations and developments of the invention described elsewhere can be combined with one another provided they are not reasonably mutually exclusive.

The LIST OF REFERENCE NUMERALS is as follows:
1 Housing
1a Guide
1b Spring elastic element (guide)
2 Sensor element
2a Sensor plane
3 Magnet holder
3a Magnet portion
3b Holding portion
3c Holding arm
4 Magnet
5 Plunger
5a Groove
5b Central axis
5c Vertical line
6 Plunger guide
7 Sensor element cover
8 Printed circuit board
9 Spring elastic element (plunger)

The invention claimed is:

1. An electromagnetic stroke measuring system, comprising:
a plunger with a longitudinal axis pointing in the stroke direction, wherein the plunger is arranged in a housing in the direction of the longitudinal axis and is movable in the direction of the longitudinal axis in said housing;
a magnet holder with a magnet arranged in a magnet portion of the magnet holder, wherein the magnet holder is arranged on a radial periphery of the plunger with respect to the longitudinal axis to be moved together with the plunger in the axial direction; and
a sensor element which is arranged on a side of the housing facing away from the plunger with respect to the longitudinal axis;
wherein the housing forms a guide in which the magnet portion is guided in the direction of the longitudinal axis at least in portions;
wherein the magnet holder has a holding portion which extends in the radial direction with respect to the longitudinal axis and is received in a recess provided therefor in the plunger;
wherein the holding portion is mounted axially without play in the recess with respect to the longitudinal axis.

2. The electromagnetic stroke measuring system of claim 1, wherein the guide surrounds the guided magnet portion in a peripheral direction on at least three points.

3. The electromagnetic stroke measuring system of claim 1, wherein the guide is configured such that the magnet portion is movable in the direction of the longitudinal axis between a first position in which at least one end of the magnet portion facing the guide engages in the guide and a second position in which the magnet portion is introduced further into the guide.

4. The electromagnetic stroke measuring system of claim 1, wherein the recess is configured as a radially peripheral groove with respect to the longitudinal axis.

5. The electromagnetic stroke measuring system of claim 1, wherein the magnet holder is pretensioned in the axial direction with respect to the longitudinal axis via a spring elastic element.

6. The electromagnetic stroke measuring system of claim 1, wherein the plunger has a central axis which extends along the longitudinal axis and wherein a sensor surface of the sensor element facing the housing is arranged parallel to a sensor plane extending parallel to the central axis, and the guide is arranged opposite the sensor surface, and wherein the sensor element is arranged outside a plane spanned by a vertical line from the central axis to the sensor plane and the central axis.

7. The electromagnetic stroke measuring system of claim 1, wherein the plunger is guided in a plunger guide in the direction of the longitudinal axis.

8. The electromagnetic stroke measuring system of claim 7, wherein the plunger is pretensioned in the axial direction with respect to the longitudinal axis via a spring elastic element, in the direction of the plunger guide.

9. The electromagnetic stroke measuring system of claim 1, wherein the plunger is pretensioned in the axial direction with respect to the longitudinal axis via a spring elastic element.

10. The electromagnetic stroke measuring system of claim 1, wherein the electromagnetic stroke measuring system is situated in a foot brake module.

11. The electromagnetic stroke measuring system of claim 1, wherein the guide surrounds the guided magnet portion in a peripheral direction over an entire surface of the guided magnet portion.

12. The electromagnetic stroke measuring system of claim 1, wherein the recess is configured as a radially peripheral groove with respect to the longitudinal axis, and wherein the groove circulates over an entire periphery of the plunger.

13. The electromagnetic stroke measuring system of claim 1, wherein the magnet holder is pretensioned in the axial direction with respect to the longitudinal axis via a spring elastic element which is arranged in the guide between the end of the magnet portion facing the guide and an end of the guide opposing this end.

14. An electromagnetic stroke measuring system, comprising:
a plunger with a longitudinal axis pointing in the stroke direction, wherein the plunger is arranged in a housing in the direction of the longitudinal axis and is movable in the direction of the longitudinal axis in said housing;
a magnet holder with a magnet arranged in a magnet portion of the magnet holder, wherein the magnet holder is arranged on a radial periphery of the plunger with respect to the longitudinal axis to be moved together with the plunger in the axial direction; and
a sensor element which is arranged on a side of the housing facing away from the plunger with respect to the longitudinal axis;
wherein the housing forms a guide in which the magnet portion is guided in the direction of the longitudinal axis at least in portions;
wherein the magnet holder has a holding portion which extends in the radial direction with respect to the longitudinal axis and is received in a recess provided therefor in the plunger;
wherein the holding portion is mounted in the recess with play in the radial direction with respect to the longitudinal axis.

15. A holder with a magnet for an electromagnetic stroke measuring system, comprising:
a magnet holder, wherein the magnet holder has a magnet arranged in a magnet portion of the magnet holder, wherein a holding portion of the magnet holder is configured as an extending arm and the magnet portion extends at an angle to the extending arm;

wherein the electromagnetic stroke measuring system includes:
a plunger with a longitudinal axis pointing in the stroke direction, wherein the plunger is arranged in a housing in the direction of the longitudinal axis and is movable in the direction of the longitudinal axis in said housing;
the magnet holder, wherein the magnet holder is arranged on a radial periphery of the plunger with respect to the longitudinal axis to be moved together with the plunger in the axial direction; and
a sensor element which is arranged on a side of the housing facing away from the plunger with respect to the longitudinal axis;
wherein the housing forms a guide in which the magnet portion is guided in the direction of the longitudinal axis at least in portions;
wherein in a plane of the holding portion from which the magnet portion extends, the holding portion at one free end has two holding arms which extend outwardly, in each case laterally on both sides of the holding portion, which are curved and which face away from the magnet portion.

16. The magnet holder of claim 15, wherein surfaces of the holding arms which run substantially parallel to the plane of the holding portion, from which the magnet portion extends, are configured to be convex at least in some portions.

17. The magnet holder of claim 15, wherein the holding portion of the magnet holder is configured as the extending arm and the magnet portion extends substantially vertically to the extending arm.

18. The magnet holder of claim 15, wherein the two holding arms are curved in the direction of extension.

* * * * *